3,551,103
PROCESS FOR THE CONVERSION OF TRITHIANE INTO CARBON DISULFIDE
Hans-Dieter Rupp, Erlenbach, Gerhard Meyer, Obernburg, and Helmut Mägerlein, Erlenbach, Germany, assignors to Glanzstoff AG, Wuppertal, Germany
No Drawing. Filed Feb. 28, 1968, Ser. No. 708,817
Claims priority, application Germany, Mar. 2, 1967, G 49,457
Int. Cl. C01b *31/26*
U.S. Cl. 23—206                    5 Claims

ABSTRACT OF THE DISCLOSURE

Process for converting trithiane into carbon disulfide by reacting trithiane and sulfur while both are in the gaseous stage and are conducted co-currently through a reaction tube heated to a temperature of 450–1000° C. Carbon disulfide can be isolated in a conventional manner and is useful in the production of viscose rayon.

---

As disclosed in U.S. Pat. No. 3,397,960 which issued from our copending application with Erhard Siggel, Ser. No. 599,264, filed Dec. 5, 1966, which in turn was a continuation-in-part of an earlier application, Ser. No. 541,481, filed Apr. 11, 1966 (now abandoned) trithiane can be converted into carbon disulfide by reaction with sulfur at temperatures of 180° C. to 250° C. This reaction is capable of being carried out either in a closed apparatus such as an autoclave at elevated pressures or in a suitable gas washing unit such as a spray tower, trickling tower or the like wherein the trithiane heated to the reaction temperature is conducted countercurrently to the flow of molten sulfur. Upon completion of the reaction, one obtains a mixture of carbon disulfide and hydrogen sulfide as reaction products, together with any excess or unreacted sulfur. The reaction products are readily separated in a conventional manner, since the carbon disulfide can be cooled to form a liquid while the hydrogen sulfide is still in a gaseous state. Any excess molten sulfur is of course first separated from the initially gaseous reaction products.

It has now been found, in accordance with the present invention that trithiane can be converted into carbon disulfide in an advantageous way and with improved results, provided that the reaction between trithiane and sulfur is carried out in such a manner that gaseous trithiane and gaseous sulfur are led co-currently through an elongated reaction zone at a reaction temperature between about 450° C. and 1000° C., thereafter cooling and separating carbon disulfide from the reaction products.

The reaction can be carried out at practically any temperature, above the boiling point of the sulfur (445° C.). The above-noted temperature range is generally consistent with the temperature resistance of available apparatus in the form of a reaction tube through which the gaseous reactants are conducted. It is particularly desirable to work in a temperature range of at least 450° C. up to about 650° C., since the greatest possible yields per unit time are achieved in this range with the least consumption of energy.

In order to completely react the trithiane so as to form both carbon disulfide and hydrogen sulfide in theoretical amounts according to the reaction equation, it is necessary to employ stoichiometric proportions of 6 mols of sulfur for each mol of trithiane. Thus, in theory, each pair of hydrogen atoms in the trithiane must be reacted with one sulfur atom to form hydrogen sulfide, while each carbon atom in the trithiane requires one additional sulfur atom to form carbon disulfide. It is a particular advantage of the present invention that high yields can be achieved by using approximately a stoichiometric amount of sulfur, i.e., such that the reaction is carried out with a molar ratio of sulfur: trithiane of approximately 6:1.

The invention is further illustrated by the following example with the understanding that the invention is not limited to this specific example.

EXAMPLE

A uniform mixture of 691.3 grams of finely pulverized trithiane and 961.9 grams of finely pulverized sulfur are dosed continuously over a period of 72 hours by means of a screw conveyor into a reaction tube heated to 500° C., where both of the reaction components immediately vaporize. The reaction tube, which may be constructed of any conventional heat-resistant material, has a length of about 10 meters and a relatively small diameter of about 10 mm. As the trithiane and sulfur vaporize, they rapidly expand and flow through the heated reaction tube. The resulting reaction products consisting of gaseous hydrogen sulfide and gaseous carbon disulfide are condensed in a receiver connected at the end of the reaction tube, cooled with Dry Ice and then separated in a conventional manner. When the reaction is carried out in this manner, one obtains 98.5% of carbon disulfide with reference to that which is theoretically capable of being obtained from the initial trithiane.

In comparison to the previously disclosed process, the method according to the present invention is especially distinguished by a higher rate of reaction and also by the use of much less complicated apparatus. In addition, there are practically no impurities in the reaction products and practically no excess sulfur requiring a separate collection and re-use. It was particularly surprising to discover that the reaction could successfully be carried out at high temperatures above the boiling point of sulfur, especially in view of the known tendency of trithiane to form more complicated by-products at high temperatures. Furthermore, the excellent results of the present invention are achieved without the addition of any catalyst to the reaction.

The carbon disulfide recovered from the trithiane by the process of the invention is of course most useful as a recycled by-product in the production of viscose rayon where the carbon disulfide is reacted with alkali-cellulose in the preparation of a viscose solution used in the conventional viscose spinning process. If desired, the hydrogen sulfide may be oxidized into sulfur by any conventional process and the resulting sulfur can be subsequently re-used for the conversion of trithiane into carbon disulfide. In this manner, one achieves a maximum utilization of the carbon and sulfur content of the trithiane which would otherwise normally be lost or wasted in the viscose spinning process.

The invention is hereby claimed as follows:

1. In a process for the conversion of trithiane into carbon disulfide by reacting trithiane with sulfur, the improvement comprising leading gaseous trithiane and gaseous sulfur co-currently through an elongated reaction zone at a reaction temperature between about 450° C. and 1000° C., and cooling and separating carbon disulfide from the reaction products.

2. A process as claimed in claim 1 wherein the reaction temperature is at least 450° C. up to about 650° C.

3. A process as claimed in claim 1 wherein the molar ratio of sulfur:trithiane is approximately 6:1.

4. A process as claimed in claim 3 wherein the reaction temperature is at least 450° C. up to about 650° C.

5. A process as claimed in claim 1 wherein said gaseous trithiane and sulfur are led through said reaction zone free of any catalyst.

References Cited

UNITED STATES PATENTS

| 3,087,788 | 4/1963 | Porter | 23—206 |
| 3,397,960 | 8/1968 | Rupp et al. | 23—206 |

FOREIGN PATENTS

| 627,423 | 9/1961 | Canada | 23—206 |
| 198,303 | 8/1967 | U.S.S.R. | 23—206 |

OSCAR R. VERTIZ, Primary Examiner

C. B. RODMAN, Assistant Examiner